United States Patent [19]
Naedel et al.

[11] Patent Number: 5,570,270
[45] Date of Patent: Oct. 29, 1996

[54] CHASSIS AND PERSONAL COMPUTER FOR SEVERE ENVIRONMENT EMBEDDED APPLICATIONS

[75] Inventors: Richard G. Naedel, Rockville; David B. Harris, Columbia; Mark Uehling, Bowie, all of Md.

[73] Assignee: Pulse Electronics, Inc., Rockville, Md.

[21] Appl. No.: 253,910

[22] Filed: Jun. 3, 1994

[51] Int. Cl.[6] .............................. H05K 7/20; H05K 7/02; F28D 21/00
[52] U.S. Cl. .......................... 361/687; 361/704; 361/748; 165/104.33
[58] Field of Search ................................... 361/816, 818, 361/209, 687, 709, 799, 111; 165/104.33

[56] References Cited

U.S. PATENT DOCUMENTS

| | | | |
|---|---|---|---|
| 5,309,315 | 5/1994 | Naedel et al. | 361/704 |
| 5,387,846 | 2/1995 | So | 315/209 |
| 5,392,197 | 2/1995 | Cuntz et al. | 361/818 |
| 5,402,323 | 3/1995 | Schwenk et al. | 361/816 |
| 5,430,607 | 4/1995 | Smith | 361/683 |

*Primary Examiner*—Leo P. Picard
*Assistant Examiner*—Jayprakash N. Gandhi
*Attorney, Agent, or Firm*—Whitham, Curtis, Whitham & McGinn

[57] ABSTRACT

A computer and a chassis construction for a computer for severe environmental conditions enclosing a plurality of circuit cards and a power supply includes a sealed, airtight, watertight, metal enclosure having a plurality of integrally joined walls, a first of the plurality of walls having a removable plate for access to the printed circuit cards and the power supply accommodated in the enclosure. The computer for use in a severe environment includes a plurality of printed circuit boards and a power supply and a metal enclosure having a plurality of walls, a top cover and a bottom plate, the enclosure being integrally formed to form an airtight seal along abutting edges thereof. One of the walls has a removable plate and the enclosure is formed of metal. A mechanism is provided for preventing ingress of foreign substances in the enclosure. The mechanism includes a device for shielding the interior of the enclosure from electromagnetic interference (EMI). The computer preferably includes a personal computer-based architecture formed by the plurality of printed circuit boards and the power supply. The sealed enclosure is preferably adapted to meet Aeronautical Radio Incorporated (ARINC) 404 and 600 form factors. A thermal mechanism is provided for a direct thermal path from the printed circuit board components to a chassis sidewall. Such a thermal mechanism and resulting direct thermal path advantageously maximize the use of the sealed enclosure in severe environments.

20 Claims, 8 Drawing Sheets

CHASSIS AND PERSONAL COMPUTER FOR SEVERE ENVIRONMENT EMBEDDED APPLICATIONS

BACKGROUND OF THE INVENTION

1. Field of the Invention

The present invention generally relates to a computer and chassis construction for electronic components and more particularly to a chassis construction for housing a computer for operation in severe environments.

2. Description of the Related Art

Hitherto the invention, conventional computer systems such as those incorporating the IEEE-1014 Standard Virtual Memory Extension (VME) bus have been predominantly used for embedded applications in severe environments, due to technology lags in personal computer (PC)-based systems. For the purposes of this application, a severe environment is defined as one subject to large environmental extremes due to temperature, humidity, radiation, electromagnetic induction, etc. An "embedded application" is defined as a specific function(s) which is contained within a larger application and requires no human intervention beyond supplying power to the computer. For example, embedded applications include, but are not limited to, systems and process control, communications, navigation, and surveillance.

However, the conventional VME-based systems are inefficient in cooling the internal computer components in that the systems are configured to have integrated circuit (e.g., "chips") mounted on one or more printed circuit boards, with the boards in turn being mounted on a wall of a sealed chassis by a coupling mechanism. The conventional systems used in severe environments rely on conduction cooling of the internal components. However; the thermal transfer path in such systems is relatively long and relies on a plurality (e.g., three) of interfaces between the chip and the chassis (e.g., the interface between the chip and the board, the interface between the board and the coupling mechanism and the interface between the coupling mechanism and the chassis wall) for cooling. Each of the three interfaces dissipates a portion of the heat being conducted along the thermal transfer path between the chip and the chassis wall. Hence, inefficient cooling of the conventional systems results from the heat dissipation at the interfaces, which may lead to faulty operation of the conventional systems.

Further, none of the conventional systems is PC-based. Another problem of the conventional systems is that, compared to a PC-based system, an inordinately large amount of resources are consumed in the conventional system's software development. A typical conventional system's application requires developing the application's source code on a host computer, such as a SUN or Digital Equipment Corporation (DEC) computer or the like, and then cross-compiling the host source code to the native instruction set of the target computer. Debugging must occur at both the host computer and the target computer. Once logical bugs are discovered and corrected in both the host computer and the target computer, then timing and input/output (I/O) bugs must also be detected and corrected. Such operations are particularly difficult when working with different computer architectures. Often other expensive electronic equipment, e.g., a central processing unit (CPU) emulator, must be coupled to the target CPU board to detect the more esoteric timing problems.

Moreover, VMEbus-embedded systems are inherently more costly, labor intensive, and time-consuming for the developer to generally field (in a severe or a friendly environment) than personal computer (PC)-based systems.

Notwithstanding the above problems, VMEbus-embedded systems have been predominantly used in the severe environment arena due to technology lags in the PC-based systems.

However, new computing technology has recently emerged which now makes the PC architecture more cost-effective for many embedded systems. This new technology includes: 1) increased availability of application code created for PC-compatibles; and 2) PC microprocessor advances. New higher density memory chips (including flash programmable read-only memories (PROMs)), highly integrated, low-cost interface chips, and the newer more powerful processors such as the Intel 80X86 processors, the Motorola 6800X0 family of processors, or the like, combine for an attractive hardware platform for massive and complex embedded applications.

Prior to the invention, no truly low cost, environmentally sealed and permanently mountable embedded computer was known which was reliably conduction-cooled.

Further, there is no known system that could leverage the installed software base of the IBM PC desktop computer system and yet be reliably used in a severe environment with efficient cooling by conduction. Known low cost, embedded, IBM PC compatible computers are either air cooled by internal fans or passive ventilation holes, or are partially sealed in a clipboard, laptop, or notebook type configuration. These latter types of configurations provide only limited sealing and thus are vulnerable to severe environments to include EMI (electromagnetic interference) environments. Further, the existing systems use card edge connections for card insertion which is a serious drawback in high vibration environments since breakage or slippage of the cards and the connectors is likely and further connections may be exposed to result in oxidation thereof, thereby decreasing the operational effectiveness of the known computers.

Thus, none of the known units is reliably conduction cooled and no known unit is a low cost, environmentally sealed and permanently mountable embedded computer which is able to leverage the installed software base of the IBM PC desktop computer system.

Further, hitherto the invention, no manufacturer has fit the array of components that is required to construct a conduction-cooled PC into the restricted dimensions and mounting requirements of the package known as an Air Transport Rack (ATR) Chassis and in accordance with standardized mounting form factors and mounting specifications as defined by the Aeronautical Radio Incorporated (ARINC) 404 and ARINC 600 form factors.

SUMMARY OF THE INVENTION

It is therefore an object of the present invention to provide a product having a severe environment embedded computing platform which has an increased conduction cooling capability and which can be used for VMEbus-based systems and for PC-based systems.

Another object is to combine the advantages of severe environment VME products with the lower costs of PC components to create a severe environment embedded computing platform which is both survivable and cost-effective.

According to the invention, a new computer (PC-based or VMEbus-based) is provided having a metal (e.g., aluminum)

enclosure and which is compatible with the Air Transport Rack (ATR) (e.g., ¼ ATR and ½ ATR) ARINC 404A and 600-8 form factors. The computer is sealed in the enclosure and uses conduction cooling from the system's electronics to the chassis sidewalls and is environmentally rugged. The computer is designed to be permanently mounted for embedded control applications.

According to a first aspect of the invention, a computer for use in a severe environment is provided including a plurality of printed circuit cards and a power supply, an enclosure having a plurality of integrally joined walls, a first of the plurality of walls having a removable plate for access to the printed circuit cards and the power supply accommodated in the enclosure, wherein the enclosure comprises metal.

Another important aspect of the invention is the unique combination of the PC-compatible architecture in a standardized mounting form factor. The form factor and the mounting specification used by the present invention is defined by the U.S. military and industry specification as well as by the Aeronautical Radio Incorporated (ARINC) 404 and ARINC 600 form factors. Hitherto the invention, no manufacturer has fit the array of components that is required to construct a conduction-cooled PC into the restricted dimensions and mounting requirements of the package known as an Air Transport Rack (ATR) Chassis.

The present invention is a unique combination of features of severe environment VME products with lower cost PC components, thereby creating a novel severe environment embedded computing platform which is both survivable and cost-effective. The resultant benefits to the developer include enhanced design flexibility, decreased software risk, and a low cost target platform. Further, the invention provides a unique combination of a conduction-cooled, PC-compatible architecture in a standardized mounting form factor and mounting specification as defined by ARINC 404 and ARINC 600. While the preferred embodiment discussed below is illustrated in terms of a PC-based architecture, it is noted that the invention is equally applicable to VMEbus-based systems.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
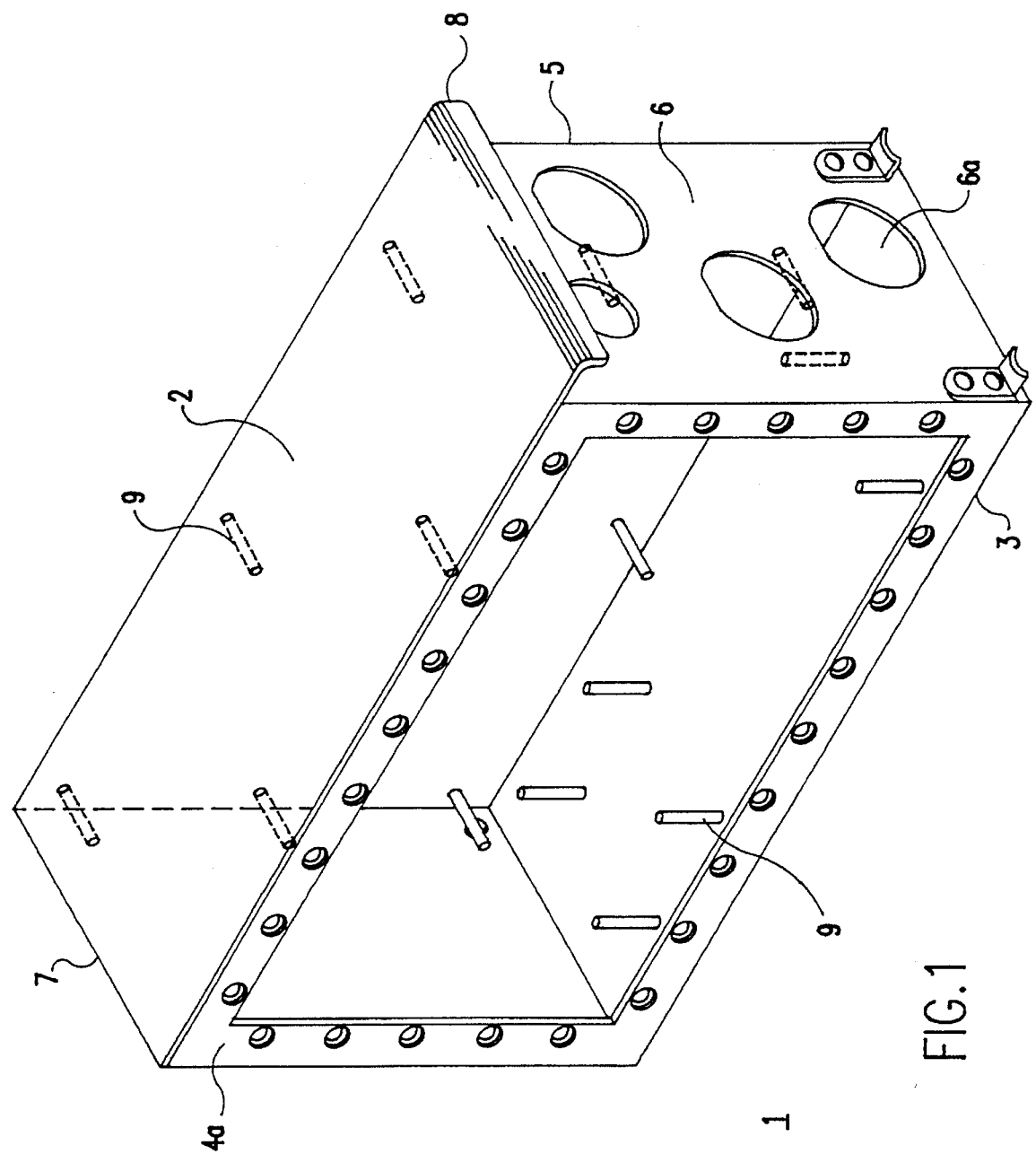
FIG. 1 is a perspective view of a chassis construction in accordance with an exemplary embodiment of the invention.

Referring now to the drawings, and more particularly to FIG. 1, a computer component chassis construction 1 is shown for accommodating a computer in accordance with one embodiment of the invention. The chassis includes a top cover 2, a bottom plate 3, a left side plate 4 including a lip area and a removable side plate 4b, a right side plate 5, a face plate 6, and a rear end plate 7, each of which are preferably formed of the same material and welded to form a rigid unibody construction. The chassis is preferably constructed of rigid metal, e.g., aircraft grade 5052H32 aluminum, and preferably has a thickness of 0.125". Other preferred materials for the chassis include steel, titanium or magnesium. The chassis is folded and welded in accordance with standard package form factors, e.g., the ½ ATR (ARINC 404A/600-8) form factors.

As mentioned above, the chassis is preferably formed of metal (and even more preferably aluminum) because metal is an excellent conductor of heat. The metallic chassis shell plate sinks and dissipates the heat directly from the CPU, memory, active logic, and disk. Further, the welded metallic shell, together with gasketing (described in detail below), provides a Faraday cage shield against EMI. Additionally, metal is advantageously used instead of plastic material or the like since metal is much stronger than plastic and can survive cyclic stress in a load bearing situation much better and more reliably than plastic. Indeed, even the strongest plastics exhibit fatigue cracking when used as load bearing structural members or interfaces to load bearing members.

The top cover 2 is a flat, rectangular sheet having an integrally formed handle 8, as shown in FIG. 1, for ease of transportability by the operator or the like. The handle extends from the cover (and more specifically a junction of the top cover and the face plate 6) by a predetermined distance and has a tongue section such that the operator may easily grasp the handle and cuff his fingers underneath the tongue section. The handle preferably has an L-shaped cross-section but may have any shape so long as the computer can be conveniently carried by the operator.

The bottom cover 3 is substantially identical to the top cover 2 with the exception of no handle being provided on the bottom cover.

The lip area 4a of the side plate 4 is formed from or welded to respective edges of the bottom, top, face and rear end plates. The removable side plate 4b is secured along its edges to the lip area 4a of the side plate 4 of the chassis by suitable means, e.g., a plurality of the fasteners, which are threaded through holes in the side plate into the lip area of the side wall into a corresponding number of threaded, blind holes formed therein.

Thus, the side plate 4b is securely fastened to the lip 4a, formed on the periphery of edges of surfaces of the bottom plate, top cover, face plate and left side plate, by a plurality of screw fasteners. Preferably, the screw fasteners are the captive type which remain with the side plate upon disassembly in order to minimize the possibility of losing the fasteners during repair or other procedures in the field which would otherwise negatively impact on electromagnetic interference (EMI) prevention. Additionally, the fasteners are preferably a seal screw-type which prevents any environmental ingress through the fastener holes. The number and spacing of the captive fasteners are desirably selected to ensure EMI integrity. The removable side plate 4b is preferably rectangular, but may have any desired shape so long as ease of installation of the computer in the chassis 1 is provided. Preferably, side plate 4b is the only removable side plate of the chassis so as to minimize any ingress of foreign material (e.g., radiation, EMI, environmental matter, etc.) and such that the chassis is airtight and watertight. The left side plate is discussed in further detail below.

The right side plate 5 which is preferably rectangular is formed of the chassis material, e.g., metal and preferably an aluminum alloy, and is welded and fixed to the face plate, the bottom plate, the top cover and the rear end plate.

The face plate 6, which is also preferably rectangular, includes a plurality of holes 6a having suitable diameters for accommodating various desired connectors for providing inputs and outputs (e.g., DC or AC power and for accommodating a plurality of I/O connectors (e.g., parallel, asynchronous serial and user-defined connectors)). Since these connectors are not germane to the invention, these connectors will not be described in detail. The face plate is formed from and is welded and fixed to the top plate, the bottom plate, the left side plate and the right side plate.

Figure 8:
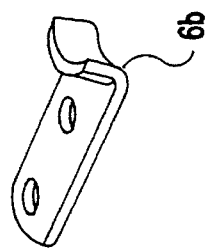
FIG. 8 is a perspective view of an L-shaped tab for mounting on the chassis according to the invention.

The front face plate 6 also is preferably provided with a plurality (e.g., two) of L-shaped tabs 6b (e.g., shown in greater detail in FIG. 8) or the like at its lower end for allowing the computer to be anchored to an installation site. The tabs are secured to the enclosure by a plurality of fasteners (unreferenced) shown on the face plate 6 in FIG. 1. By unclamping the tabs from the installation site, the computer may be evacuated from its installation site for repair, maintenance, etc. and then easily installed subsequently to its repair, etc. The computer/enclosure arrangement, which is designed for avionics, marine, ground mobile, and weather exposed fixed site applications, is designed to be fixedly mounted on a rack, bulkhead, compartment, etc., whereas the conventional clipboard, laptop, and notebook computers are for carrying by the operator. Hence, a significantly greater amount of components and correspondingly greater computing power can be provided in the computer according to the present invention.

The enclosure is in accordance with form factors designated in the Aeronautical Radio Incorporated (ARINC) 404A/600-8 specification for avionics style packaging and complies with U.S. military and industry specifications. The chassis may be built to have a plurality of sizes (e.g., including, but not limited to, ½ Air Transport Rack (ATR) and ¼ ATR). The ½ ATR preferably measures 4.88" wide by 7.62" high by 12.62" deep and weighs about 10 pounds. The ¼ chassis preferably measures 2.25" wide by 7.62" high by 12.62" deep and weighs about 7 pounds. The ½ ATR is advantageously used when the ISA bus backplane is fitted in the computer since the ½ ATR has the necessary interior area for accommodation of the backplane. The ½ ATR also has a greater face plate surface area to accommodate a greater number (and variety) of I/O connectors. The ¼ ATR is advantageously used when a lighter and more compact chassis is desired since it occupies less than 50% of the volume of the ½ ATR. However, the ¼ ATR is not able to accommodate the computing power that the ½ ATR can. Hence, if greater computing power outweighs the greater weight considerations, the ½ ATR is desirably selected.

The individual plates (and lip area 4a) of the chassis, excluding the removable side plate 4b, are welded together to provide an integral, sealed enclosure. The welded chassis construction provides for a very rigid yet inexpensive (<$100) chassis with minimized EMI leakage paths. This contrasts to costly machined piece parts found in known chassis constructions used in ruggedized applications. Further, the welded chassis according to the invention virtually eliminates the EMI leakage emanating from the seams in conventional bolt-together construction.

A universal bolt pattern configuration in the chassis having a plurality of bolts 9 is used for the mounting of customized cards, disc drives and other electronic components to the chassis floor and/or the removable side plate 4b. Such a universal bolt pattern permits mounting of hard discs and customized cards in a variety of locations within the chassis without any modification thereto.

Figure 2:
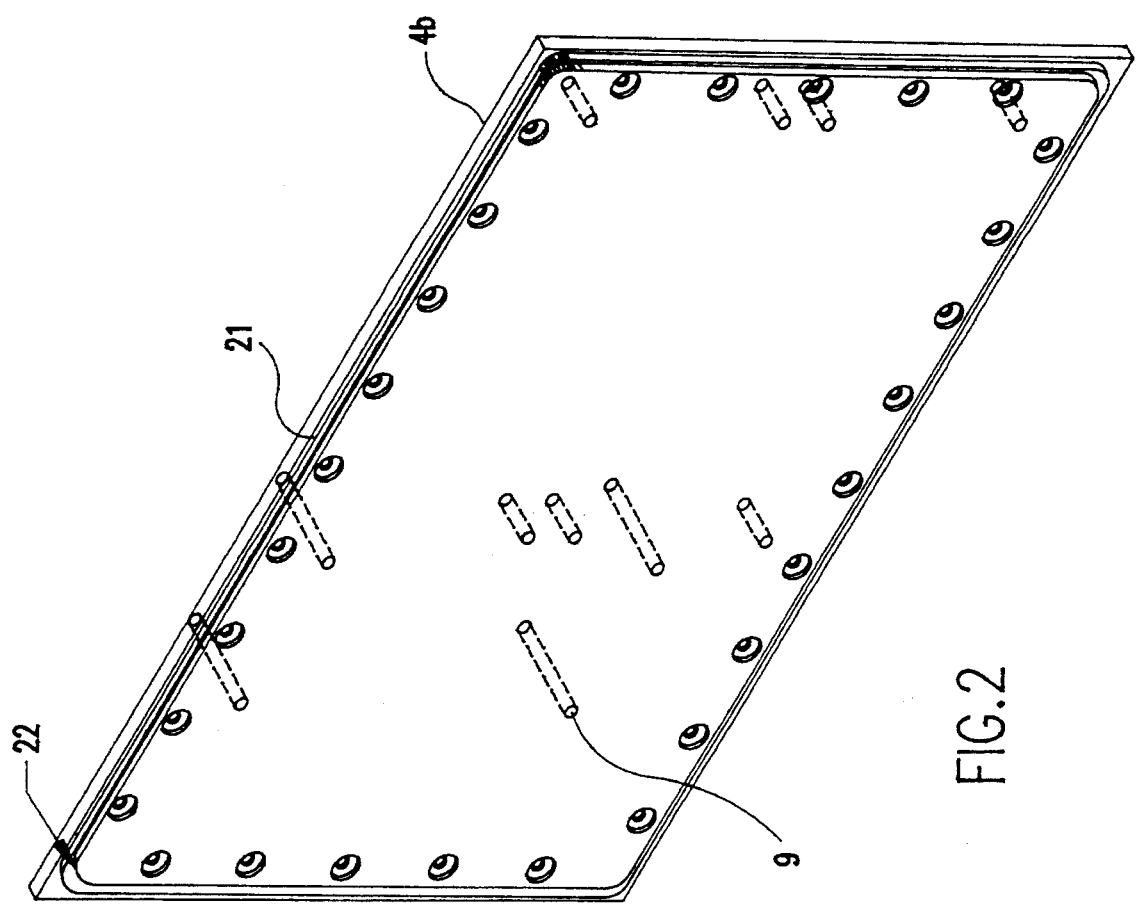
FIG. 2 illustrates a removable side plate of the chassis illustrated in FIG. 1.

As shown in FIG. 2, the side plate 4b integrates a fluorosilicone conductive elastomer seal, e.g., gasket, 21. The seal is mounted in a groove 22 formed in an inner wall around the periphery of the side plate 4a. The seal is a field proven conductive fluorosilicone elastomer seal which prevents ingress of moisture, salt, fog, fungus, sand, dust, grease, oil, solvents and the like. The seal allows the chassis to be airtight and watertight. The gasket's conductive component also provides highly effective EMI shielding properties. The design and construction technique of the chassis sidewall will deflect less than 0.005" given a 10 Grms random vibration loading.

Figure 3:
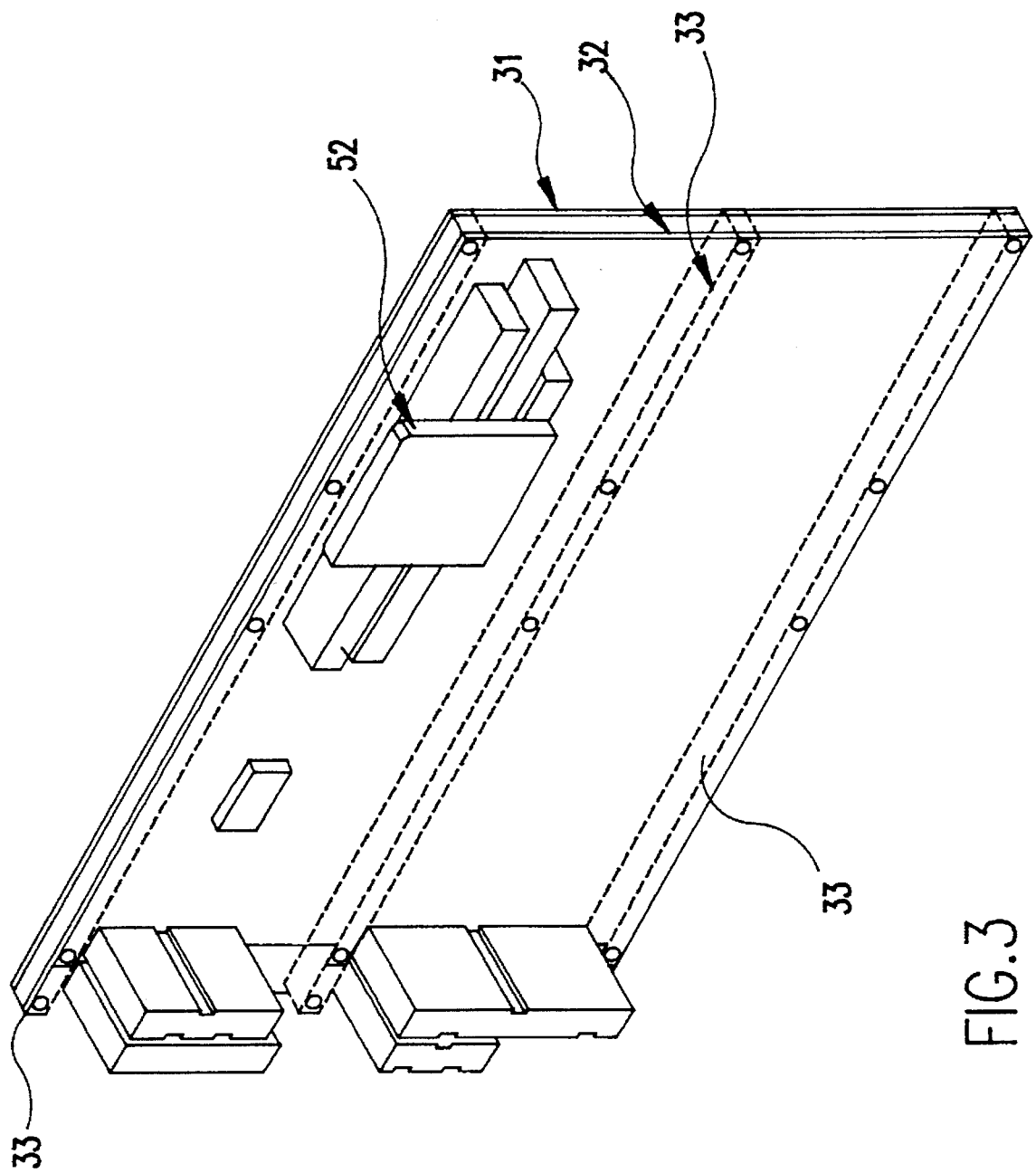
FIG. 3 is a perspective view of the printed circuit boards sandwiched together as a subassembly.

As shown in FIG. 3, a CPU board 31 and an I/0 board 32 are bolted together as a single module utilizing a plurality, e.g., three, of stiffener bars 33 which are preferably formed of epoxy resin and glass roving per MIL-R-9300 Type 1 and MIL STD 60346B and which preferably have a 0.25" square cross-section and which extend the length of the boards. Other materials, such as aluminum, may be used for the stiffener bars. The combined board pair module subassembly preferably measures approximately 7" by 10" (e.g., in one embodiment, the subassembly measures 6.5" by 10.5"). The small geometry of the boards, combined with the multi-structural cross linking, enables the system to reliably operate in a shock and vibration environment of 20 g shocks and 8 Grms of continuous random vibration. Thus, unlike the conventional systems, no card edge connections for card insertion are used by the computer according to the invention and thus the inventive computer is much more reliable in high vibration environments since damage to the electrical interconnections is much less likely. FIG. 3 also illustrates a plurality of connectors (unreferenced) mounted on the printed circuit board subassembly.

Figure 4:
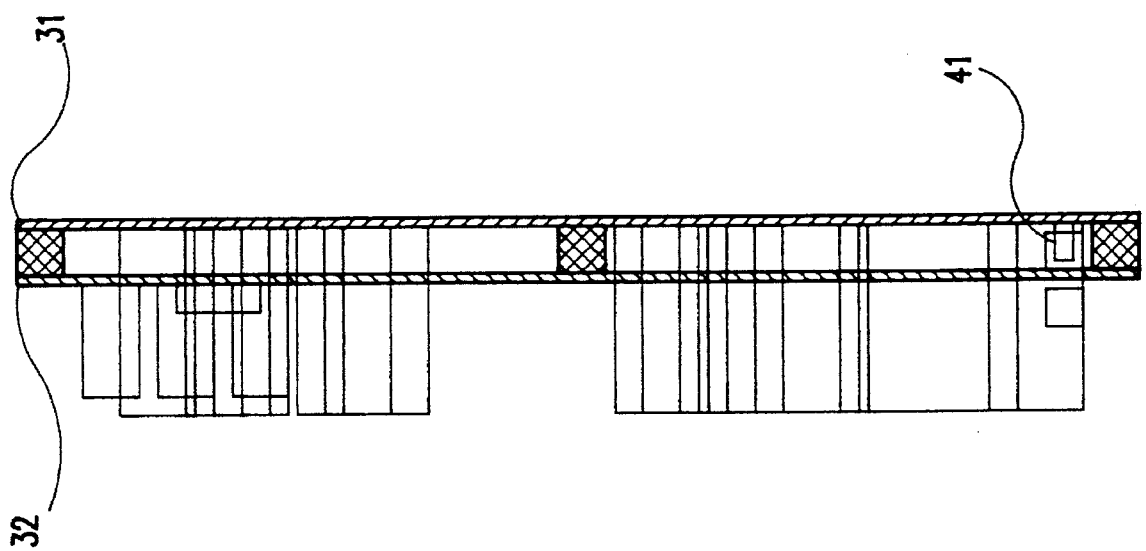
FIG. 4 is a sectional view of the printed circuit board sandwich construction illustrated in FIG. 3.

Board-to-board interconnection is completed using connectors 41 or the like which are mounted directly to the computer boards, as shown in FIG. 4. The connectors are commercially available and may be formed in a variety of different configurations. For example, the connectors may be formed as surface-mounted micro strips which are adapted to mate together. More specifically, plugs on a first micro strip on a first board are adapted to be fitted into sockets of a second micro strip on a second board. The connectors 41 mate together when the boards are mounted to the stiffener bars 33 as a board pair module subassembly. The two boards using large scale integration combine all of the functionality of a full size desktop computer and one or more add-on boards for memory and I/O.

Special parts, as provided by various component suppliers, allow extended operation in a wide ambient temperature range of substantially 0° C. to +55° C. (32° F. to 131 ° F.). Optional extended temperature screening for the total system components ensures operation in the extreme temperature range of substantially −40° C. to +71 ° C. (−40° F. to +160° F.). Even if the operator selects a Flash PROM disk option for mass storage, as discussed below, these temperature and dynamic stress extremes can still be met. In contrast, if greater storage is required, a hard disk may be employed. However, while providing a greater storage (e.g., up to two orders of magnitude greater) capability, the hard disk option discussed below meets less severe environmental specifications.

The small geometry of the boards, combined with multi-structural cross linking as provided by the stiffening members 33 etc., enable the system to operate through 20 g shocks and 8 Grms of continuous random vibration. The bolted-together board pair modules ensure that relative motion in the connector is minimized providing highly reliable electrical connectivity during vibration and shock events. Further, the extended operational temperature range allows the system to be used in harsh environments and applications that had been previously excluded.

Figure 5:
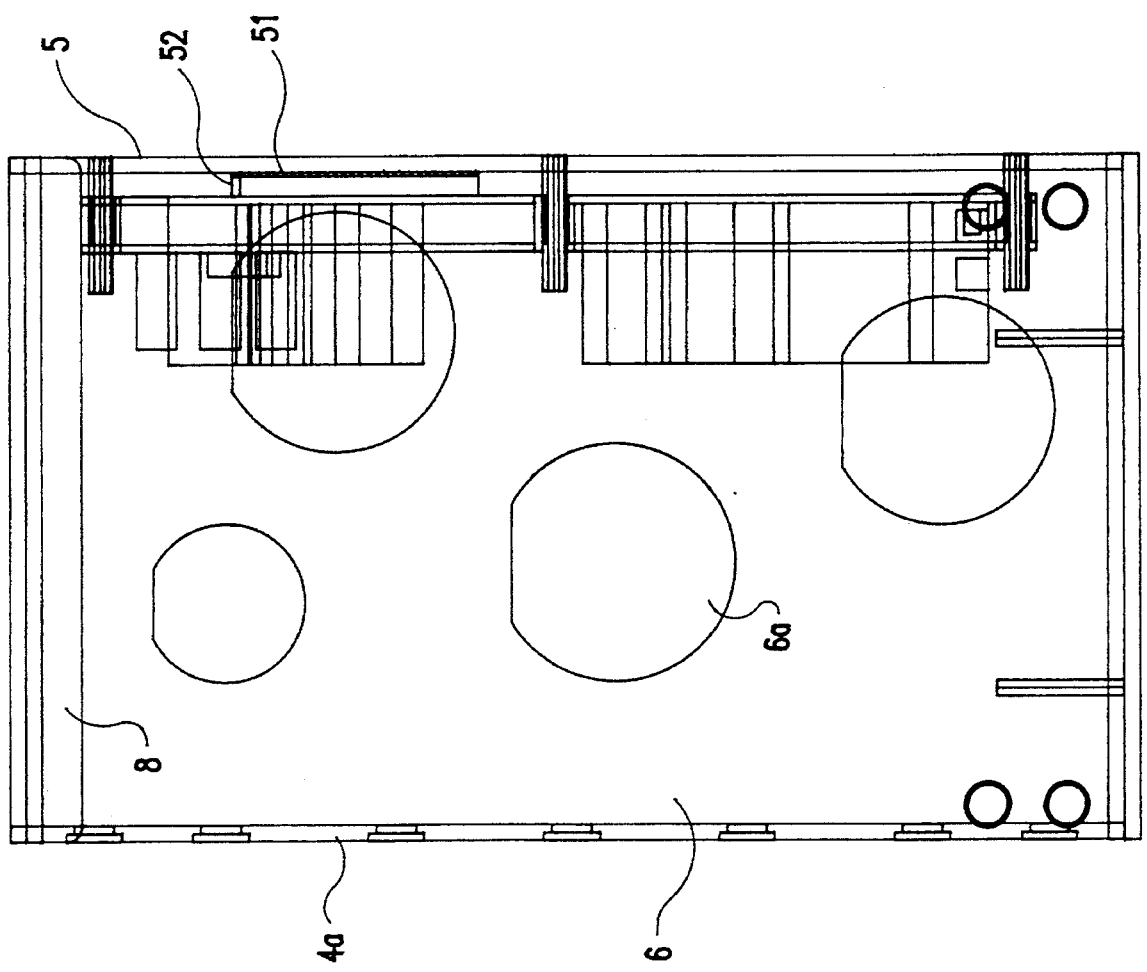
FIG. 5 is a fight side view of the chassis construction illustrated in FIG. 1.

Additionally, as shown in FIG. 5, the board module subassembly is mounted in the chassis 1 so as to promote the most efficient possible heat transfer while still maintaining shock and vibration integrity. This inventive arrangement provides for conduction cooling in a sealed enclosure. Specifically, the thermal path for the CPU and other high heat generating components directly extends from the chip carrier and the leads to the chassis side wall (e.g., the interior wall of the right side plate 5). Thus, heat is dissipated through the side wall of the chassis without the use of fans, ventilation holes and the like.

The temperature rise is minimized through a commercially available silicone gel thermal interface material 51, as shown in FIG. 5. Additionally, the silicone gel 51 serves as a removable hydrophobic conformal barrier and provides the printed circuit boards with a moisture barrier for protection against humidity in the ambient air. Simultaneously, the material provides a thermal path that has a lower thermal impedance than air from an electronic component 52, (e.g., the chip) on the board to the chassis sidewall. Thus, conduction cooling of the electronic components and the boards is provided by the invention which is advantageous over the conventional systems which utilize fans and/or ventilation holes since a less complex system results and the enclosure, while being reliably cooled, is completely sealed.

For example, with a thermal conductivity of k=0.0056 W/inC, the temperature rise through a 0.060" thickness of material 51 is approximately 30° C. for a 6-watt processor. Such results have been shown experimentally by the inventors. At a maximum operating temperature of 70° C, the computer in the enclosure according to the invention operates with a junction temperature of less than 125° C., which is below the maximum rated temperature for reliable operation. The material 51 also provides damping of the CPU 31 and I/O board 32 pair module during exposure to vibration and shock environments.

For applications or prototypes requiring AT-bus-compatible plug-in boards, the computer preferably includes an internally mounted 3-slot expansion backplane (ISA) for third party boards. Specifically, the embedded computer design features a vibration-isolated ISA backplane (e.g., motherboard) 61, detached from the CPU board 31, for expansion utilizing off-the-shelf IBM compatible cards. A plurality (e.g., three) of IBM-AT bus plug-in boards are selectively mountable in the backplane. The ISA backplane can accommodate any standard ISA board, regardless of the length of the board. The chassis itself is the limiting factor on the boards' dimensions and it clearly evident that the chassis may be modified to receive boards having any dimensions. Thus, a chassis having a relatively longer dimension would accommodate boards having relatively greater dimensions in the length direction. For example, the ARINC specification allows for a 19.6" length and thus a chassis could be easily built accommodating boards having such a length. Further, the chassis could be easily modified to accommodate boards having a width which is narrower or wider than that described above.

Figure 6:
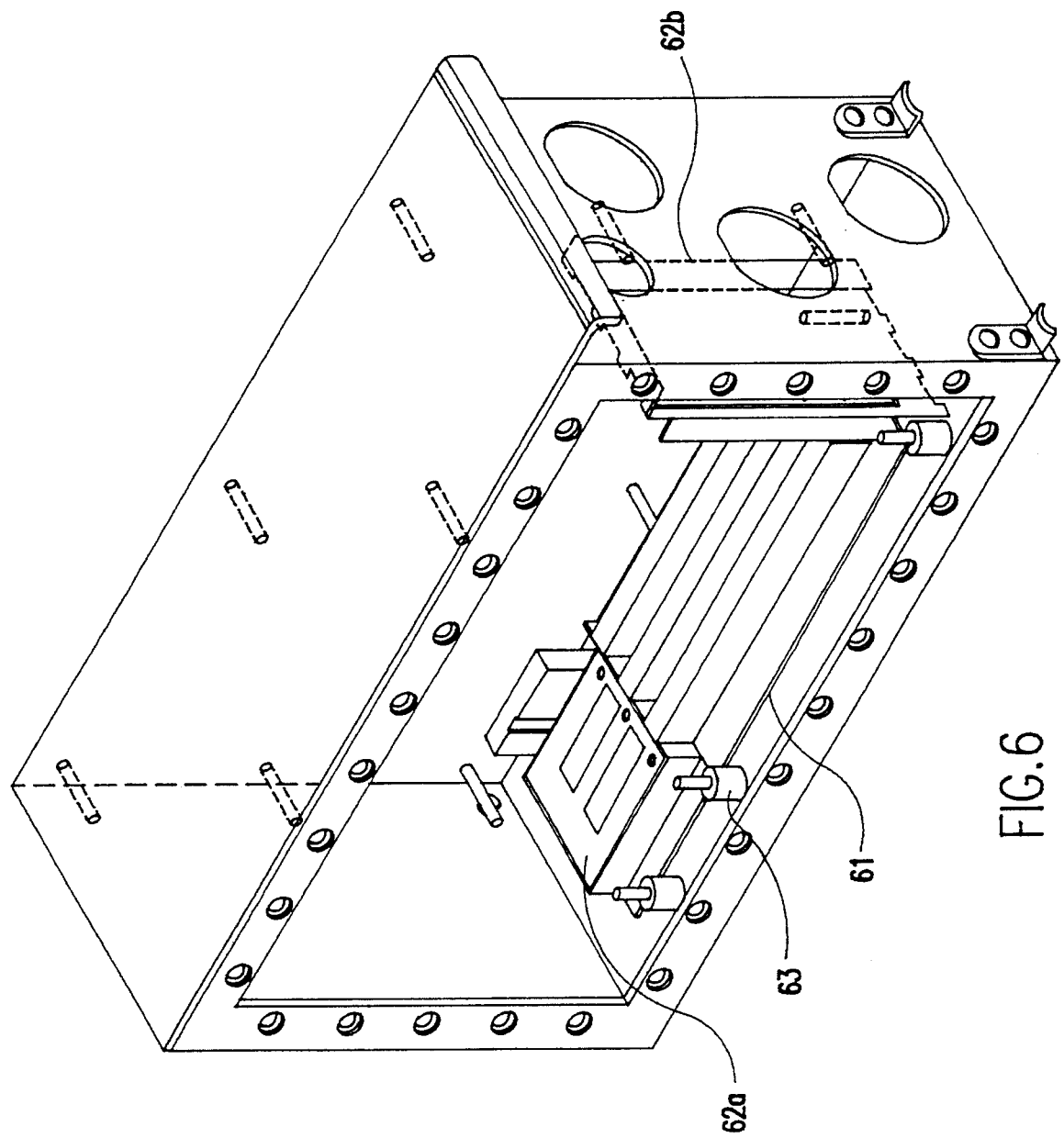
FIG. 6 is a perspective view of the chassis construction illustrated in FIG. 1 having an Industry Standard Adaptor (ISA) printed circuit board (PCB), e.g., "the motherboard", mounted therein.

In one embodiment of the invention, the ISA backplane preferably accommodates cards up to 5" in height and up to 9" in overall length. The slots are preferably spaced on 0.8" centers. A plurality e.g., two, custom designed mounting brackets 62a, 62b support the cards in position on the floor of the chassis (e.g., on the interior surface of the bottom floor plate 3). The brackets reliably and fixedly position the cards without the use of the chassis rear wall and card guides typically used by the conventional systems. The brackets are especially advantageous in high vibration environments since breakage of the cards (and the connectors) as typically encountered in the conventional systems, is unlikely with the inventive arrangement. A first bracket 62a is preferably mounted on the inner wall of the bottom plate 3, whereas a second bracket 62b is preferably mounted on the bottom plate and right side plate 5. The first and second brackets 62a, 62b are preferably positioned at approximately and substantially a 90° angle to one another for reliably fixing and positioning the cards. FIG. 6 shows the ISA backplane (e.g., the motherboard) 61 mounted in position in the chassis with the custom hold down brackets 62a, 62b.

The vibration isolation of the ISA backplane 61 is preferably performed by the vibration isolators 63 which comprise rubber, such as neoprene or the like, having a suitable diameter (e.g., $\frac{7}{16}$"), and which are mounted to the underside of the backplane 61. The vibration isolators 63 serve to dampen vibration and absorb shock and permit the use of AT bus compatible cards not normally utilized in vibration and shock environments. Such features advantageously extend the applications and processing capabilities of severe environment processors. The custom hold-down brackets 62a, 62b fixedly position the cards and ensure that the cards remain reliably seated on the connectors during rough handling or continuous vibration.

Figure 7:
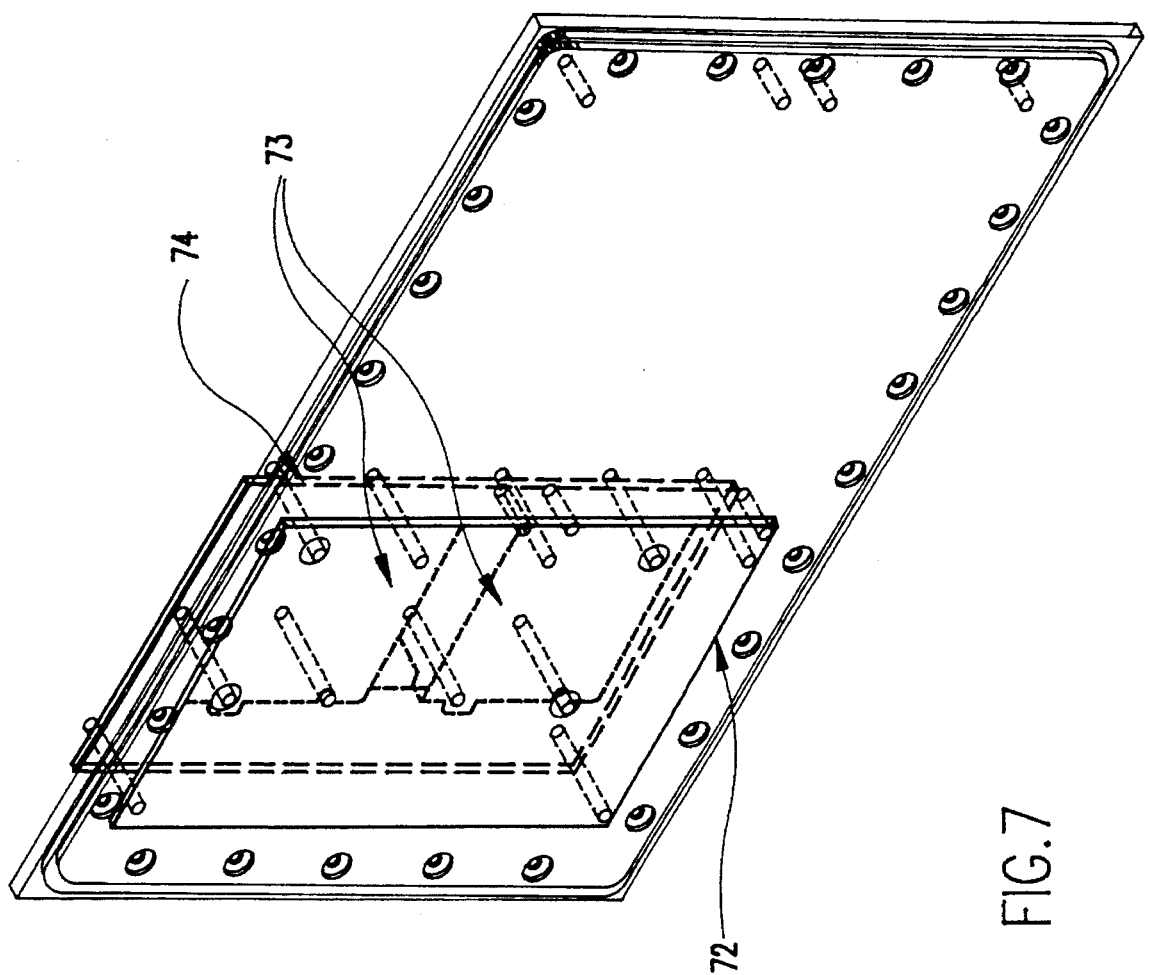
FIG. 7 is a perspective view of the left side cover plate of the chassis construction illustrated in FIG. 1 having a power supply mounted therein.

A power supply subassembly 71, shown in FIG. 7, is also provided and is modularly constructed such that a desired power supply may be easily swapped into the system. The modular design uses the same mounting plate 72 and mounting hole pattern configuration which matches the fastener pattern 9 on removable side plate (e.g., cover) 4b. This arrangement permits power supply subassemblies to be easily interchanged depending on the incoming power requirements. The power supply subassembly includes a heatsink mounting plate 72 which serves as a base for mounting thereon interchangeable power supply components 73 and their associated computer boards 74. The power supply subassembly preferably mounts to the removable side cover of the chassis, as shown in FIG. 7. In addition to the power supply, disc drives, custom cards and the like can also be mounted to the left side cover.

The side cover mounted power supply 74 and hard disk (discussed in further detail below) result in a low impedance thermal path ensuring high component reliability. The modular construction of the power supply mounting assembly permits quick interchange between 12 V (DC), 28 V (DC), 48 V (DC) and 115 V (AC) power inputs with no modification to the chassis or the cover. Additionally, heat generated by power supply inefficiency is dissipated directly from the power supply base plate 72 into the side plate 4b. This provides a very efficient thermal path to the outside ambient air and provides conduction cooling for the computer according to the invention. Since the chassis construction according to the invention is designed to house a true IBM-compatible clone, there is no difference in the software which runs on a desktop computer and that which runs on the computer system according to the invention. The computer architecture can run the industry "standards" such as MS/DOS, Windows, UNIX, NT, etc., as well as any of the off-the-shelf real-time runtime systems provided by various software vendors. The user merely loads his own preferred software in the known manner.

Looking at the structure of the computer itself in greater detail, a processor (e.g., an Intel Corporation 486 processor, a Motorola 6800×0 family processor or the like) is preferably provided with a parity-protected, dynamic random access memory (RAM) having a suitable storage capacity (e.g., 4 MB, 8 MB or 16 MB). A 256 KB write-back cache memory is also preferably provided. The operation of the cache is preferably controlled by software. A basic input/output operating system (BIOS) read-only memory (ROM) is preferably provided in the computer which is MS/DOS compatible and which preferably supports either a hard disk or the solid state "Flash Disk" drives, as well as standard floppy disks. The BIOS is upgradable as new versions become available. Specifically, for applications requiring mass storage capability, the PC can support either an internally mounted hard disk drive preferably having a storage capacity of either 120 MB or 240 MB, or a shockproof solid state "disk" including one or more Flash PROMs (e.g., a "Flash Disk") preferably having a capacity of either 4 MB, 8 MB or 16 MB. A flash disk which typically includes an array of flash PROMs and read/write support circuitry, is typically used to store the user's application program so that the embedded computer boots up and executes the application immediately on powering up. These options, combined with the BIOS support software, appear as a standard rotating hard disk drive to the processor preferably provided in the computer. The flash disk is preferably hardened by stiffener bars 33 on the board, so as to be survivable and operational through the same temperature, shock and vibration extremes as the motherboard.

The hard disk preferably is both conduction cooled and shock mounted to provide resilience to shock and vibration. While the hard disk will not be as vibration-immune as the flash disk, it is more robust than standard commercial offerings. Being internally shock-mounted in the chassis 1, the hard disk is protected from moisture, dust, dirt, Electromagnetic Induction (EMI), solvents and the like.

An externally connected floppy disk is preferably used to quickly load up or back up the user's files to either the hard disk or the flash disk. A face plate connector is preferably provided for connecting an external floppy disk, typically for program development.

If the user's embedded computing application requires a keyboard or printer, the computer according to the invention has standard interfaces to support a keyboard, a bi-directional parallel printer port (LPT1), and standard serial ports (e.g., 4 RS-232 Asynchronous serial ports COM 1, 2, 3, and 4). If the application requires a display terminal, the computer according to the invention supports the user's choice of either cathode ray tubes (CRTs) or liquid crystal display (LCD) panels. For LCD panels, monochrome and color (active matrix) are supported. Data and power connectors are preferably provided in accordance with MIL-C-26482.

The chassis configuration of the present invention has been certified to achieve military specification for environmental test procedures (e.g., MIL-STD 810E) and the National Electronics Manufacturer's Association (NEMA) standard, NEMA 250-1991 (for type 4 and 12 enclosures). Further, the EMI sealing of the embedded computer chassis is designed to pass FCC Class A and MIL-STD-461C Tests.

The invention provides cooling in a completely different manner from that of the known systems. Specifically, the problems of the conventional VMEbus-based systems with regard to conduction cooling have been discussed above. Further, embeddable IBM PC-compatible computers, developed primarily for the industrial marketplace, are known. However, as also discussed above, all of these units are air cooled (some with fans, some with simple ventilation holes) and thus limited in the severity of their intended environment since they are not sealed against foreign matter. Further, while there are a few makers of sealed units, these units are of the clipboard, laptop, or notebook type, which have only a limited sealing capability. Additionally, nearly all of these existing systems use card edge connectors as a means for card insertion. The use of card edge connectors is a fatal flaw in high vibration scenarios since the cards may be easily damaged in severe environments.

Figure 9:
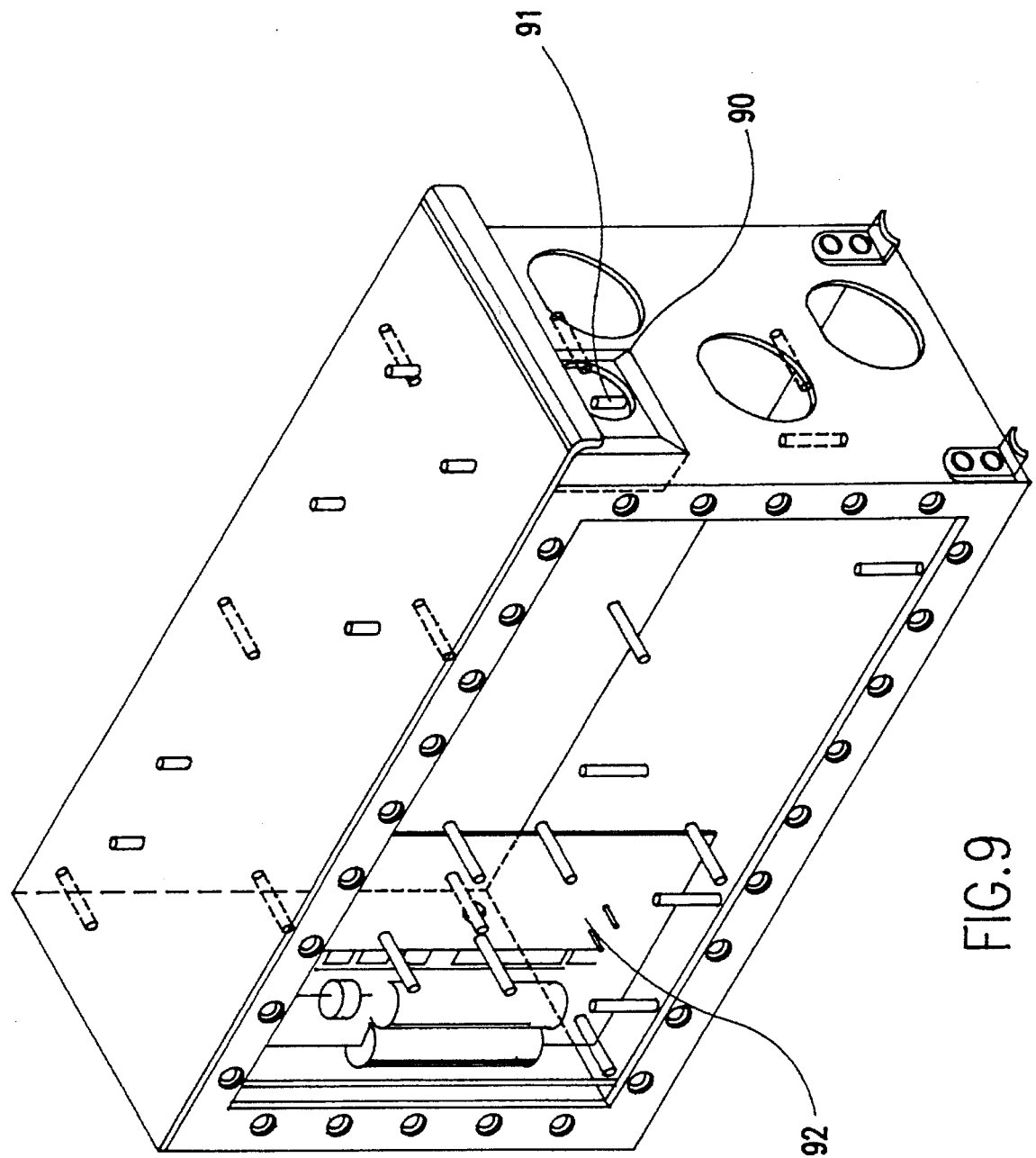
FIG. 9 is a perspective view of a chassis construction having an input power filter.

As mentioned above, the computer according to the invention is protected by a sealed (against both water, EMI, etc.), air- and watertight, heavy gauge aluminum chassis, conforming to a standard package form factor (ARINC 404A/600-8). The enclosure is further distinguished by severe environment power and I/O connectors. The inventive computer has been designed and packaged for optimum survivability in environments where severe shock, vibration, moisture, dust, and temperature extremes are prevalent. It is differentiated from the conventional air-cooled products by its sealed nature and use of conduction cooling, as well as by its use of an input power filter or a series of input power filters designed to allow the computer to withstand poor input power and to minimize conducted emissions (e.g., filter extraneous noise). These input power filters, as shown in FIG. 9, include an enclosure 90 (e.g., a housing) commonly referred to as a "dirty" box, one or more EMI filters 91, and an input attenuator module 92. The "dirty box" is suitably mounted to the chassis over the power connector and is adapted to be connected to the main power input cable. The EMI filter(s) is housed by the enclosure 90. A plurality of EMI filters are preferably used in a series or parallel configuration to minimize conducted emissions. The input attenuator module 92 is suitably coupled to the power supply module and is provided for line rectification, EMI/RFI filtering, transient protection, in-rush limiting and DC compatible to the DC-to-DC power converter. The attenuator 92 is also coupled to the main power supply cable through suitable connection (e.g., wiring or the like) to the EMI filter(s) on the dirty box.

Further, the computer according to the invention is differentiated from the clipboard, laptop, or notebook group by means of form factor, survivability, cooling efficiency and water/EMI seal integrity. The structure of the invention and the resultant benefits to the developer are evidenced by enhanced design flexibility, decreased software risk and a low cost target platform.

The invention has been designed for simple and near instantaneous migration from desktop applications and desktop based software directly into the field application.

According to the invention, a unique combination of the PC-compatible architecture is provided in a standardized mounting form factor defined, for example, by ARINC 404 and ARINC 600. The present invention provides a powerful and unique array of components in a conduction-cooled computer which is in turn fitted into the restricted dimensions and mounting requirements of an Air Transport Rack (ATR) Chassis.

With the unique combination of features of severe environment VME products with lower cost PC components as provided by the present invention, a novel severe environment embedded computing platform is constructed which is survivable and cost-effective. While the preferred embodiment has been described as using a PC-based architecture, VMEbus-based architecture can also be used in the chassis to the invention, so as to have the inventive configuration and reliable, more efficient conduction cooling.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer including a plurality of printed circuit boards having integrated circuits mounted thereon and a power supply coupled to said printed circuit boards, comprising:

a sealed, airtight, watertight enclosure for accommodating said plurality of printed circuit boards and said power supply, said enclosure having a plurality of integrally joined walls, a first of said plurality of walls having a removable plate for access to said plurality of printed circuit boards and said power supply accommodated in said enclosure, wherein said enclosure comprises metal and wherein heat is dissipated by conduction along a thermal path from said integrated circuits directly to at least one of said plurality of walls of said enclosure, and means for coupling first and second boards of said plurality of printed circuit boards to form a board pair module subassembly, said board pair module subassembly being mounted to on inner surface of a wall of said plurality of walls.

2. The computer according to claim 1, further comprising means for conduction cooling said printed circuit boards and said power supply, said conduction cooling means including means for positioning said plurality of printed circuit boards such that said thermal path from said integrated circuits on said plurality of printed circuit boards is directly to an interior surface of said at least one of said plurality of walls, said conduction cooling means further comprising silicone gel being positioned between said interior surface of said at least one of said plurality of walls and at least portions of said plurality of printed circuit boards.

3. The computer according to claim 1, means for coupling said removable plate to said first wall.

4. The computer according to claim 1, further comprising means for sealing said removable plate, said sealing means being provided between an edge of said removable plate and an edge of said first wall.

5. The computer according to claim 4, wherein said removable plate includes a groove formed along an outer peripheral edge thereof, said sealing means being accommodated in said groove.

6. The computer according to claim 1, wherein said means for coupling first and second boards comprises at least one stiffener bar located between adjacent surfaces of said first and second boards, said board pair module subassembly including means for electrically connecting said at least two printed circuit boards such that said boards are physically isolated from one another.

7. The computer according to claim 1, further comprising means, positioned on said first and second boards to be coupled together, for interconnecting said first and second boards together as said first and second boards are mounted to said coupling means as said board pair module subassembly.

8. The computer according to claim 1, further comprising temperature minimizing means positioned between said printed circuit boards and an interior wall of said enclosure.

9. The computer according to claim 1, further comprising means for providing a moisture barrier between said plurality of printed circuit boards and ambient air.

10. The computer according to claim 1, further comprising means, coupled to at least one interior wall of said enclosure, for mounting selected ones of said plurality of printed circuit boards.

11. The computer according to claim 1, further comprising means, positioned on said removable plate, for receiving said power supply, said receiving means including means for allowing said power supply to be selectively and modularly replaced with an alternative power supply.

12. The computer according to claim 1, further comprising a predetermined bolt pattern arranged on at least one of a first wall of said removable plate and a surface of a second wall of said plurality of walls.

13. The computer of claim 1, further comprising means, detached from at least one of said plurality of printed circuit boards, for accommodating a second plurality of printed circuit boards.

14. The computer of claim 13, further comprising means for absorbing vibration applied to said means for accommodating said second plurality of printed circuit boards, and means, coupled to respective inner surfaces of walls of said plurality of walls of said enclosure, for fixedly positioning said second plurality of printed circuit boards in said means for accommodating said second plurality of printed circuit boards.

15. The computer according to claim 4, wherein said sealing means comprises an elastomer seal material.

16. A chassis for accommodating a plurality of computer components and a power supply, said chassis comprising: a plurality of integrally joined walls forming a sealed, airtight, watertight enclosure, a first wall of said plurality of walls having a removable plate for access to said plurality of computer components and said power supply accommodated in said chassis, said walls comprising metal;

means for rigidly mounting said plurality of computer components and said power supply within said enclosure such that a thermal path of heat dissipated by said computer components and said power supply is directly to an interior surface of at least one of said plurality of walls; and means for shielding an interior of said enclosure from foreign matter.

17. The chassis of claim 16, wherein said shielding means comprises means for shielding the interior of the enclosure from electromagnetic interference, said electromagnetic interference shielding means comprising sealing material around said removable plate and the plurality of walls being integrally formed and joined together.

18. The chassis of claim 16, further comprising means for conduction cooling said enclosure, said conduction cooling means including means for positioning said plurality of printed circuit boards such that said thermal path from said integrated circuits on said plurality of printed circuit boards is directly to an interior surface of said at least one of said plurality of walls, and silicone gel being positioned between said interior surface of said at least one of said plurality of walls and at least portions of said plurality of printed circuit boards.

19. A conduction-cooled computer having a plurality of printed circuit cards accommodated within said enclosure and a power supply mounted within said enclosure and coupled to said plurality of printed circuit cards, comprising:

an enclosure having a plurality of walls, a top cover and a bottom plate, said enclosure being integrally formed to form an airtight, watertight seal along abutting edges thereof, one of said walls having a removable plate and said enclosure being formed of metal; and means for preventing ingress of foreign substances in said enclosure, preventing means including means for shielding said plurality of printed circuit cards and said power supply in said enclosure from electromagnetic interference.

20. The computer according to claim 1, wherein said computer includes means, coupled to one of said plurality of integrally joined walls and adapted for connection to a power input line for providing power to said computer, for minimizing conducted emissions over said power input line, said means for minimizing conducted emissions comprising an input power filter.

* * * * *